C. C. MOSHER.
MACHINE FOR TREATING RUBBER COMPOUND OR OTHER PLASTIC MATERIALS.
APPLICATION FILED MAR. 24, 1921.

1,396,138.

Patented Nov. 8, 1921.

Inventor
C. C. Mosher
By Howard A Coombs
Attorney

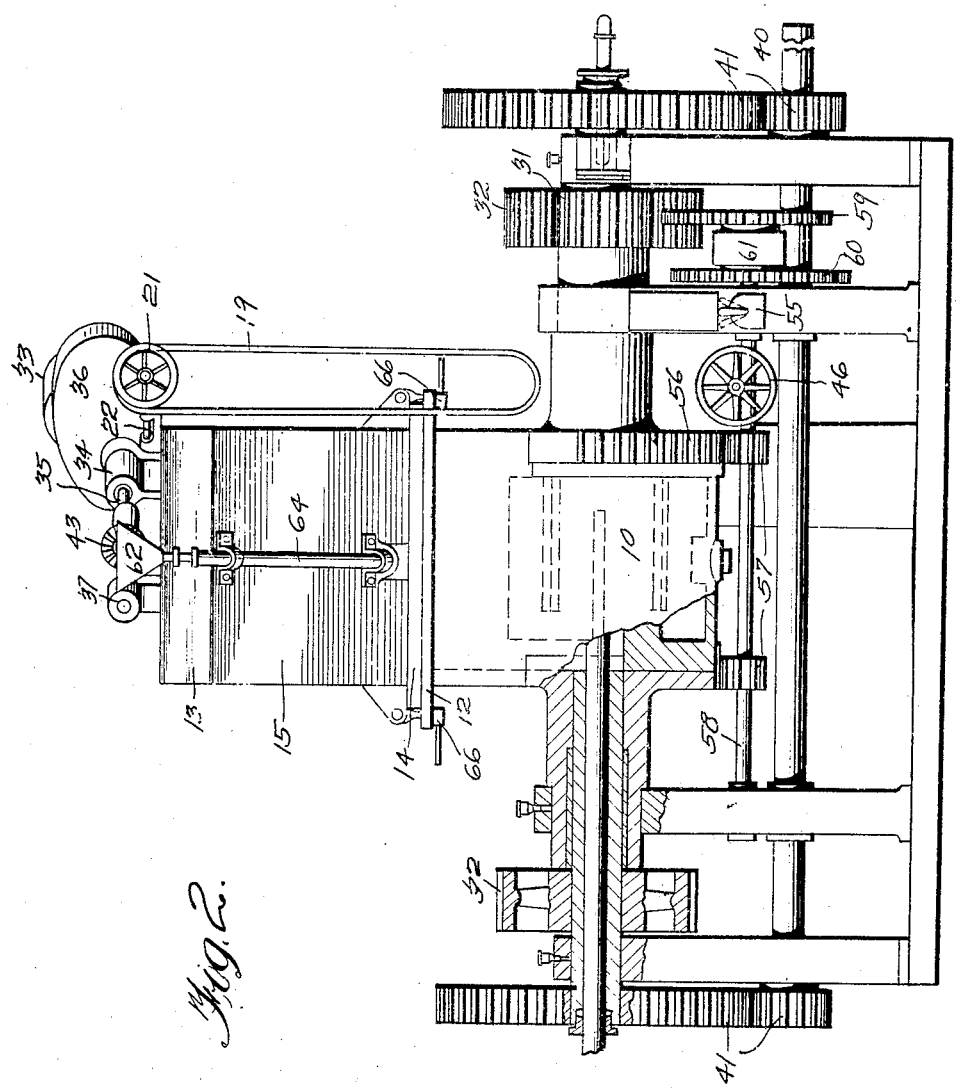

C. C. MOSHER.
MACHINE FOR TREATING RUBBER COMPOUND OR OTHER PLASTIC MATERIALS.
APPLICATION FILED MAR. 24, 1921.
1,396,138.
Patented Nov. 8, 1921.
6 SHEETS—SHEET 3.
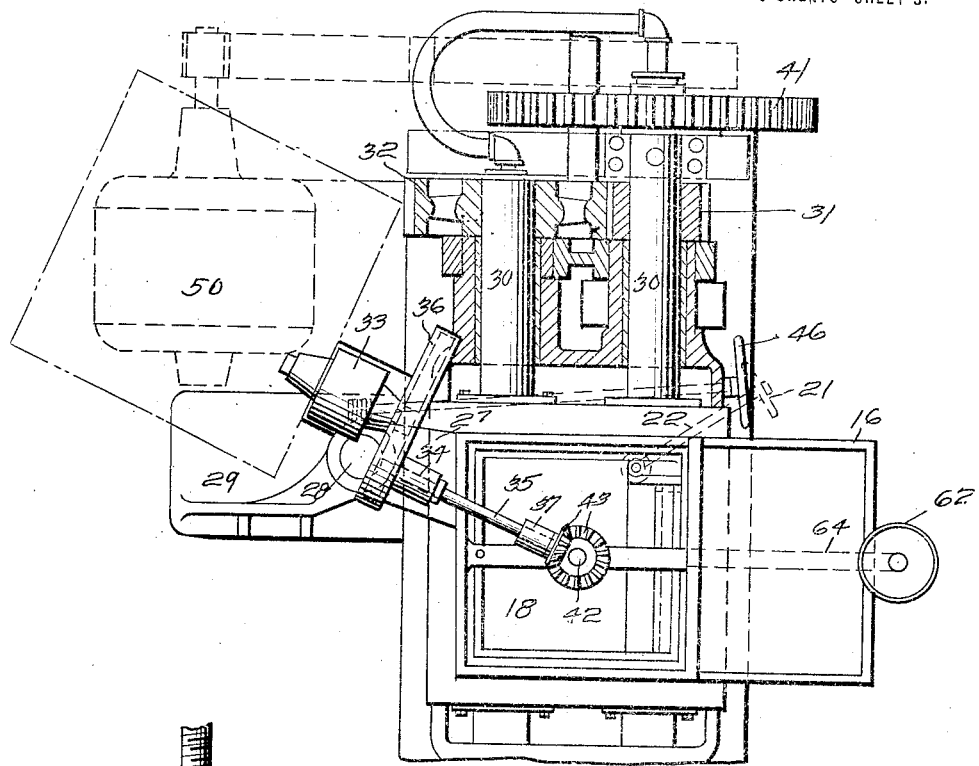
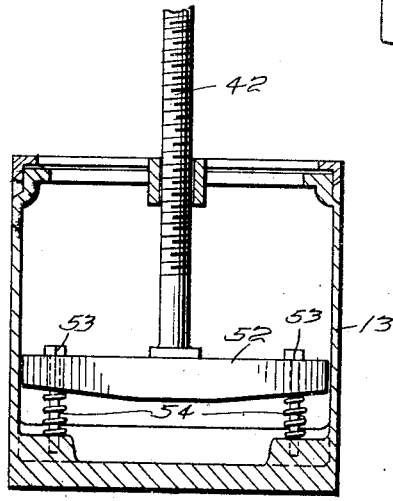
Fig. 4.
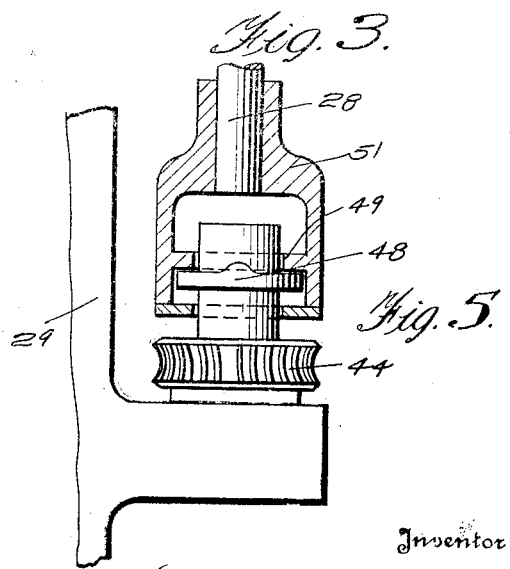
Fig. 3.
Fig. 5.
Inventor
C. C. Mosher
By Howard Coombs
Attorney

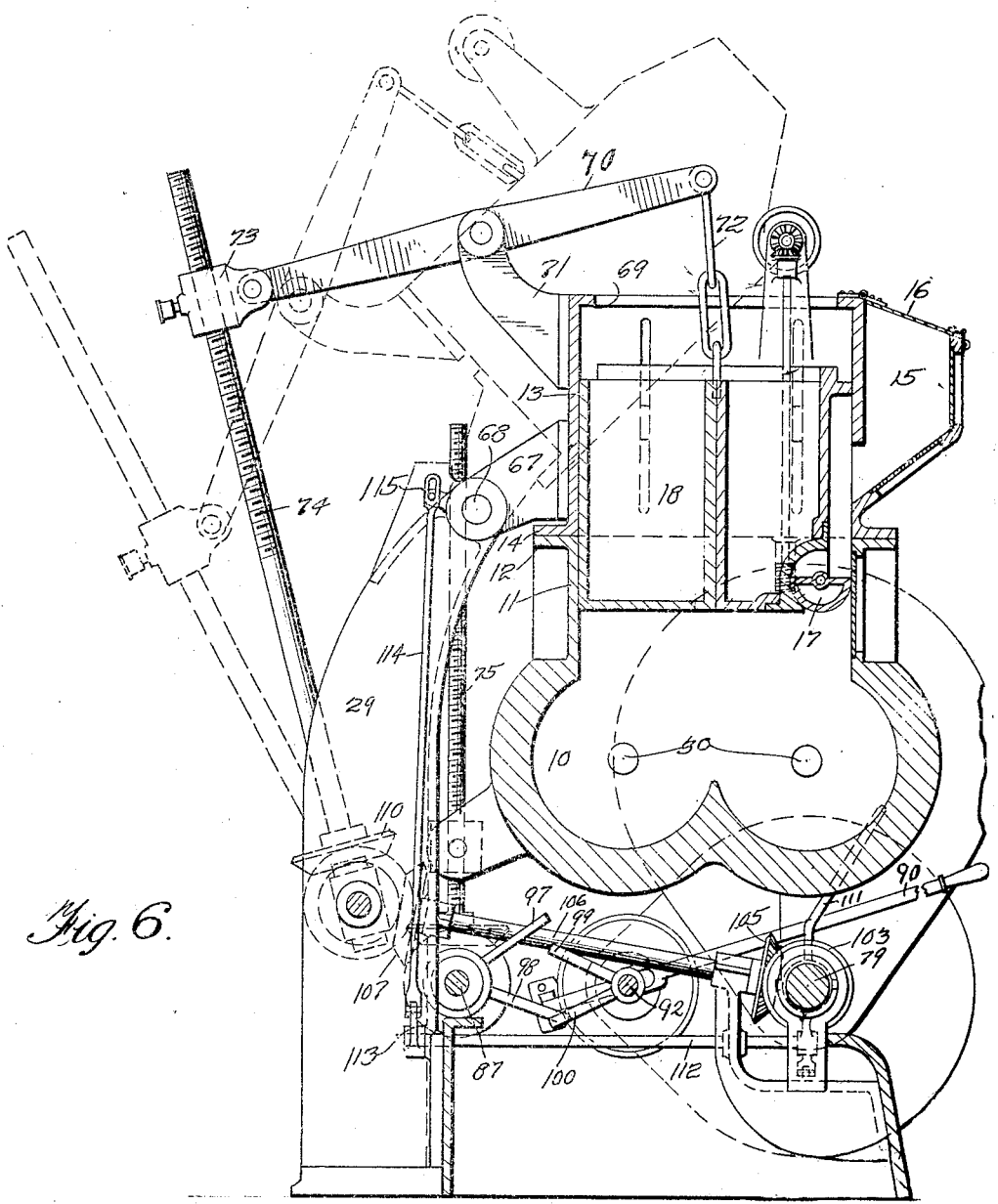

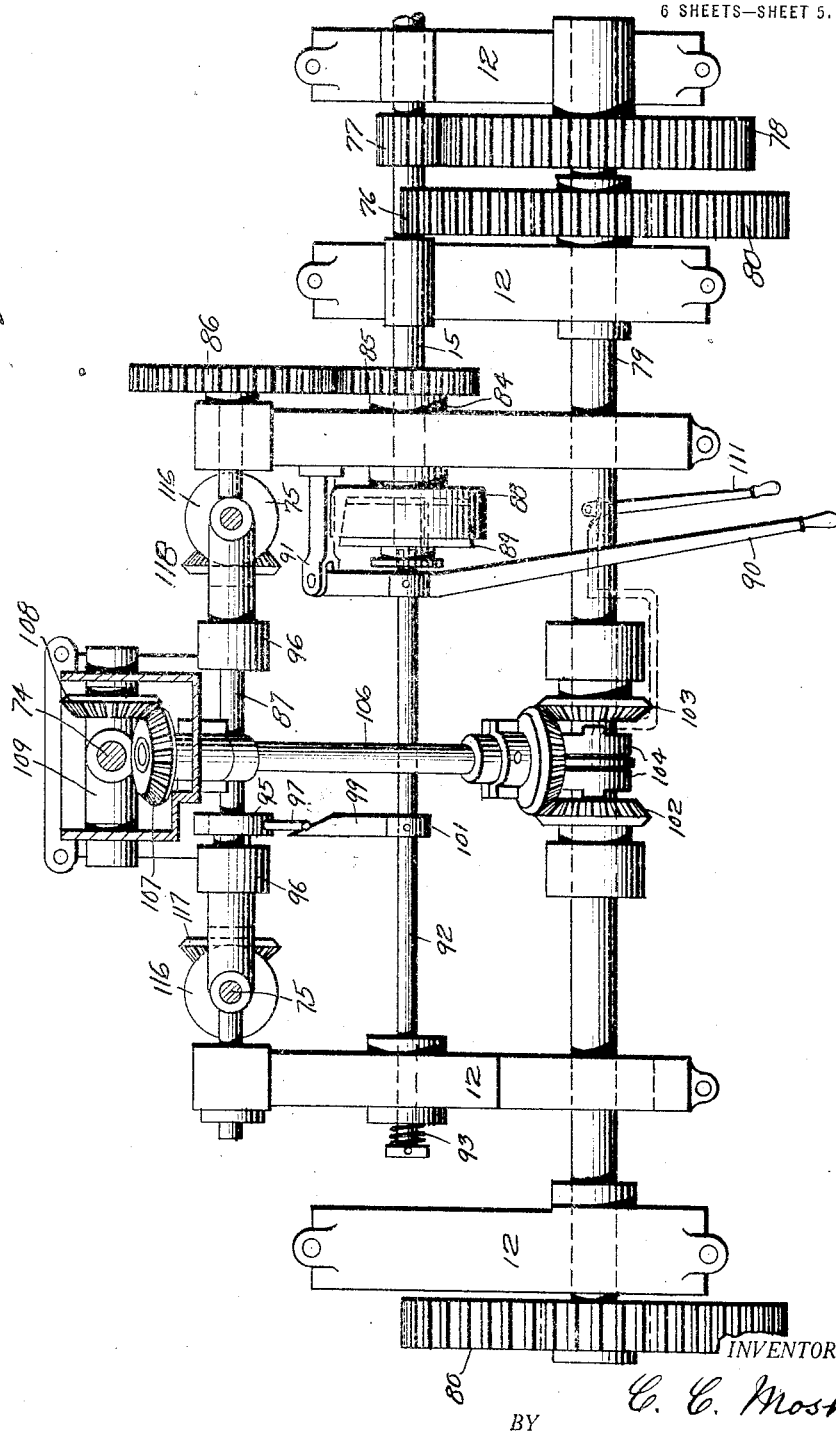

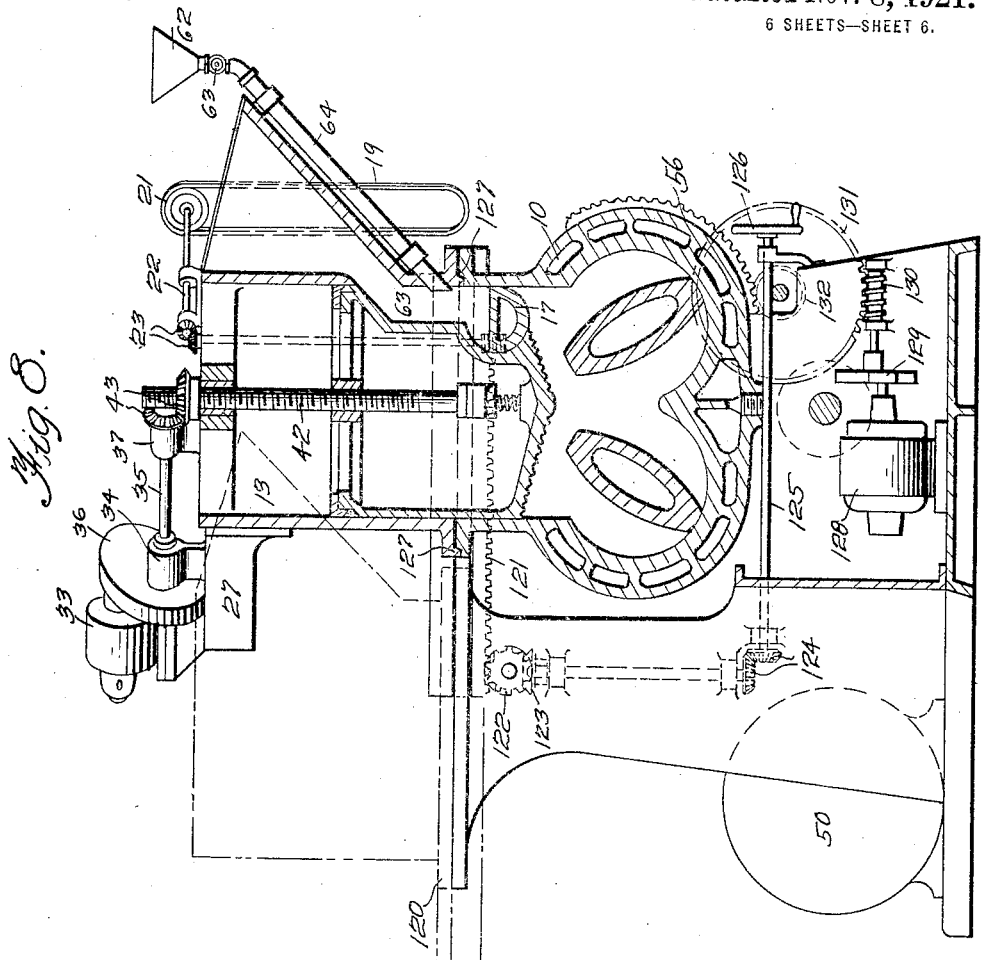
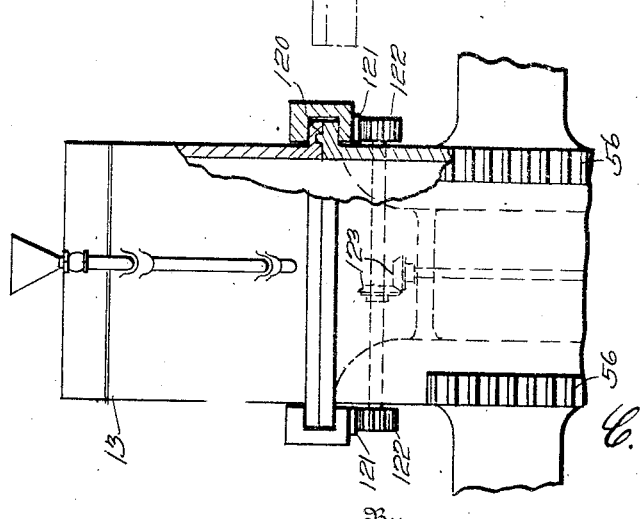

UNITED STATES PATENT OFFICE.

CLIFFORD C. MOSHER, OF LIMA, OHIO.

MACHINE FOR TREATING RUBBER COMPOUND OR OTHER PLASTIC MATERIALS.

1,396,138.

Specification of Letters Patent.

Patented Nov. 8, 1921.

Application filed March 24, 1921. Serial No. 455,248.

*To all whom it may concern:*

Be it known that I, CLIFFORD C. MOSHER, a citizen of the United States, residing at Lima, in the county of Allen and State of Ohio, have invented new and useful Improvements in Machines for Treating Rubber Compound or other Plastic Materials, of which the following is a specification.

My invention relates to machines for treating rubber and other plastic material, of the type commonly known as rubber-compound mixers or masticators, and in which provision is made for adding powdered filling material, and the like during the mixing, kneading or masticating of the crude or other rubber.

These machines usually comprise a double mixing trough, containing two mixing blades on parallel shafts and capable of being tilted about the axis of one of said shafts for the purpose of dumping the charge, the trough having an upstanding neck, usually rectangular in cross-section and having a flange at its top, and a box-like weight slidable in the neck to close the trough during the mixing operation.

In certain machines of this kind, a box-shaped frame is provided, which fits on the flanged top of the trough neck and in which the weight also slidably fits, said frame being provided with a side hopper for the introduction of ingredients through the weight into the trough. When the trough is to be charged or to be tilted to dump its contents, the frame and weight must be removed from the top thereof, and means are provided for lifting them off, as in the machine patented to me on March 8, 1921, No. 1,371,046.

The present invention contemplates the removal of the hopper and weight without the use of an overhead structure and hoisting means, as shown in my said patent, so that the machine will be self-contained and require less head-room. I have devised several different specific constructions for accomplishing this object and will illustrate three of them in the accompanying drawings, claiming specifically only the preferred form of means, which is that in which the hopper box or frame is swung horizontally about a vertical axis to remove it from the trough.

In the drawings, Figures 1 to 5 illustrate this preferred form; Figs. 6 and 7 a form in which the hopper swings backwardly about a horizontal axis onto and off the trough; and Figs. 8 and 9 a simpler form in which the hopper box slides horizontally onto and off the trough. In this case the box is moved by hand-operated mechanism while power means is provided for raising the weight; the same is true of the machine of Figs. 1 to 5, while in the machine of Figs. 6 and 7, the weight is raised by power means and at a certain point in its upward movement engages the hopper box and causes it to be tilted back about the horizontal axis around which it swings.

To describe the different views of the drawings more specifically:

Fig. 2 is a front view of the same, partly in section;

Fig. 3 is a plan view of the same, partly in section;

Fig. 4 is a vertical section of the sliding weight closure;

Fig. 5 is a detail view, partly in section, of part of the mechanism;

Fig. 6 is a vertical section of the second form;

Fig. 7 is a plan view of the operating mechanism of this machine below the trough;

Fig. 8 is a vertical section of the third form of machine; and

Fig. 9 is a partial front view of the same, partly in section.

Figure 1:
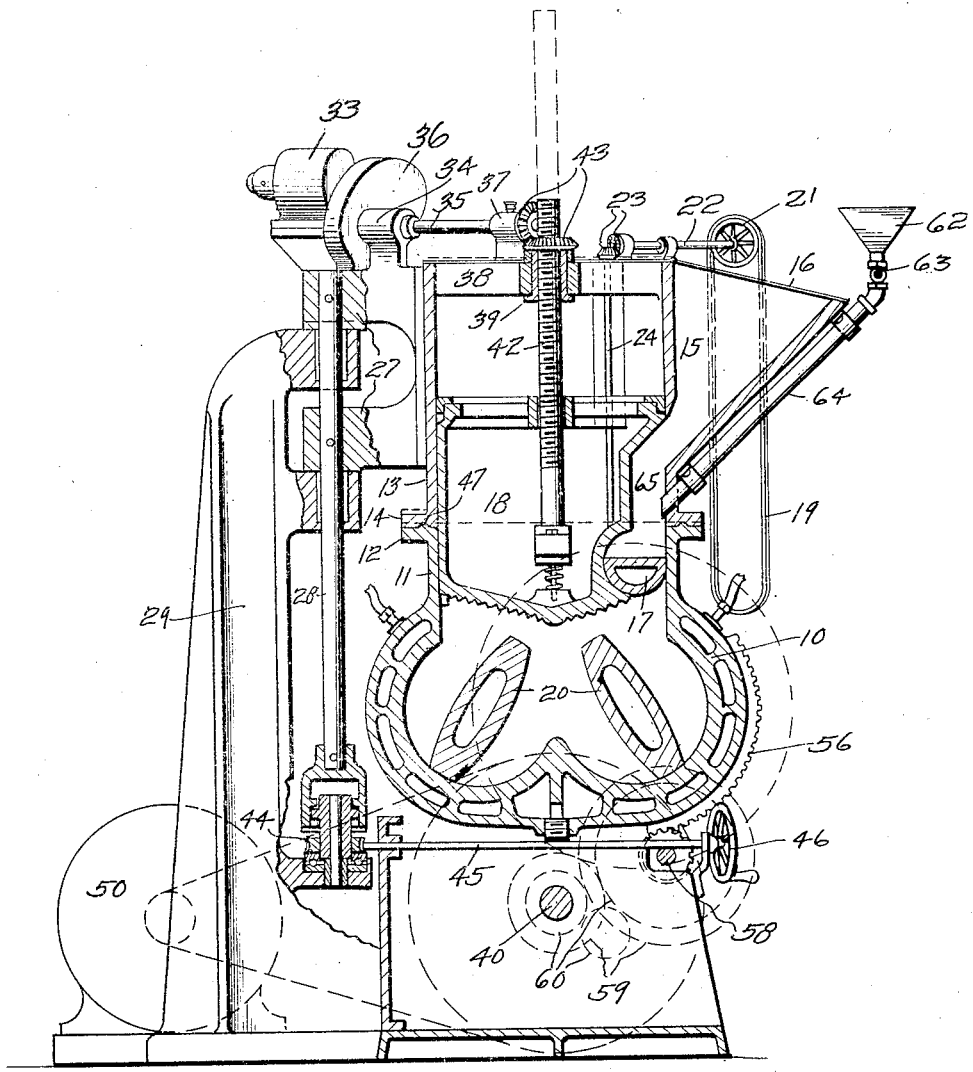
Figure 1 is a vertical section through the preferred form of machine.

In each form of the machine, the trough, mixing blades, and trough-tilting mechanism constitute no part of the present invention and may be of any of the usual constructions. The trough is shown at 10, the mixing blades at 20, mounted on the shafts 30, connected by meshing gears 31, 32, one of which is or may be of twice the diameter of the other, so that the mixing blades run at different speeds. The drive to that one of the shafts 30, which constitutes the axis about which the trough can be tilted, is from the driving shaft 40, itself driven, for example, by a motor 50, through a suitable train of gearing, indicated at 41. The trough 10 has an upstanding neck 11, of rectangular cross-section and provided with a flange 12 at its top, on which seats a frame or box 13, provided with flange 14, and having a hopper extension 15 on its front side, closed by a cover 16 and leading to a semi-cylindrical valve 17, journaled in a concave seat in the lower front edge of the box-like closure or weight 18. The valve 17 is manually controlled by a chain 19, sprocket wheel 21, shaft 22, bevel gearing 23, vertical shaft 24, and worm 25, engaging worm-wheel teeth on the valve or a worm-wheel on its shaft.

So far, the different embodiments of my invention are alike, but from now on they differ. The description immediately following applies to the machine of Figs. 1 to 5 only.

The box 13 has two rearwardly projecting arms or brackets 27, in both of which is secured a vertical shaft 28, journaled in a standard 29, constituting a part of the frame of the machine. The upper arm 27 has a platform-like support for an electric motor 33 and a bearing 34 for the shaft 35, driven through reduction gearing in the casing 36 by said motor, and also journaled in a bearing 37, carried by the hopper-box 13 on a cross-bar 38 at the top of the same. In the center of said cross-bar is journaled a bushing 39, which constitutes a nut for the weight-elevating screw 42, being operatively connected to said shaft 35 by bevel gears 43. The shaft 28 is rotated, to swing the box 13 off and onto the neck 11 by a worm wheel 44, driven by a worm on shaft 45, carrying hand-wheel 46 on its front end.

In this form of the machine, in which the hopper box 13 is swung horizontally onto and off the trough neck, it has first to be raised slightly in order to clear a packing groove, formed in its flange 14 from a similar rib 47, formed on the flange 12 of said neck. This is accomplished by a cam 48, integral or fast with the worm-wheel 44, which coacts with a shoulder 49, on the cup-like head 51 secured to the lower end of shaft 28. The first effect therefore of the actuation of shaft 45 by hand wheel 46, is to rotate the worm wheel 44 and cam 48 until the latter, by contact with the shoulder 49, raises the shaft 28 and box 13 sufficiently to clear the groove in the flange 14 from the rib 47, whereupon further rotation of said worm wheel rotates shaft 28 and swings hopper box 13 into the dotted line position of Fig. 3.

The connection of the screw 42 with the weight closure 18 is made yielding, said screw carrying a crosshead 52, through which pass loosely bolts 53, screwed into lugs on the bottom of said weight and surrounded by compression springs 54. 55 in Fig. 2 represents a controlling switch for the motor 33. The trough is tilted by means of segment gears 56 secured to it and in mesh with pinion 57 on a shaft 58, which can be driven in either direction from the driving shaft 40, through gears 59 in one direction and through gears 60 in the other. 61 in Fig. 2 represents a clutch by which either train of gears is made operative.

It is sometimes desired to add a liquid ingredient, such as oil, to the batch and I provide, for this purpose, a funnel 62, valve 63 and pipe 64, secured to the outside of the hopper 15 and leading into the recessed portion 65 of the weight 18 above the valve 17, as shown in Fig. 1. Bolts 66 may be provided to clamp the box flange 14 onto the neck flange 12, as shown in Fig. 2.

The second form of machine, illustrated in Figs. 6 and 7, differs in that the hopper-box 13 is pivoted by its arm 67, on a horizontal pivot shaft 68, carried by the standard 29 at the rear of the machine and about which it is swung by the means which raises and lowers the weight 18. For this purpose, the box has an inwardly-projecting flange 69 at its top, with which the top of the weight engages as it is raised, after which further elevation of the weight swings it and the hopper upwardly and rearwardly about said axis 68. The weight elevating means comprises a lever 70, pivoted on a bracket 71 projecting rearwardly from the hopper-box, one end of said lever being connected to the weight by links 72 and the other end carrying a pivoted nut 73, in which engages the oscillatable screw 74, mounted and driven in a similar way to the rough tilting screws of my Patent 1,371,046, aforesaid. The trough in this machine is shown as tilted by similar screws 75.

In this machine, 76 is the primary driving shaft, journaled in bearings 12 and being itself driven by a motor or a reversible belt drive, not shown. It carries the pinion 77 which meshes with and drives gear 78 on countershaft 79, which in turn carries a pinion at each end, which drive gears 80 on one of the agitator shafts 30, as is common in machines of this kind. On the inner end of driving shaft 76, which only extends about half way across the machine, is secured a sleeve 84, carrying a gear 85, which drives gear 86 on the rough tilting shaft 87, at the rear of the machine, and carrying also the female member 88 of a friction clutch, the male member 89 of which is slidably keyed on the end of shaft 76. Member 89 is moved into or out of engagement with the member 88 by means of a hand lever 90, pivoted on a bracket 91, secured to the frame and pivotally connected to a rod 92, slidably mounted in the frame and acted upon by a spring 93, tending to disengage the clutch members 88, 89. When it is desired to drive the shaft 87, to actuate the rough-tilting screws 75, the clutch is thrown in by hand lever 90, the direction of rotation of said screws being changed, to tilt the trough up or return it, by reversing the direction of rotation of the driving shaft 76. If preferred, manual means may be provided for rotating the trough-tilting shaft 87, for returning the trough to normal position. I may provide in this form of machine, means for automatically disengaging the clutch 88, 89 in case the hand lever 90 is not released at the proper time. This means consists of a collar 95, secured to the yoke 96, carrying one of the trough-tilting screws 75 and swinging about the shaft 87 as the trough is raised and lowered, in which collar are mounted two radial pins 97, 98, in position to engage, near the ends of their angular movement, cam arms 99, 100, projecting from a collar 101, mounted on rod 92. When the trough is tilted to full discharge position, pin 97 engages the cam surface of arm 99, causing rod 92 to be moved longitudinally to disengage the clutch 88, 89, and when the trough is returned to its normal position, pin 98 engages arm 100 and disengages said clutch again.

The means for driving the weight-elevating and hopper-box tilting screw 74 consists of two bevel gears 102, 103, loose on countershaft 79, on which is slidably keyed a clutch sleeve 104 to connect either of said gears to said shaft. In mesh with both of said gears is a bevel gear 105, fast on an inclined fore-and-aft shaft 106, on the other end of which is mounted a bevel gear 107, meshing with a bevel gear 108 on a short shaft 109, on which swings the yoke carrying the screw 74. Bevel gear 108 meshes with a bevel gear 110 on said screw, whereby the latter is driven in one direction or the other, according as to which gear 102 or 103 is clutched to shaft 79. The clutch sleeve 104 is shifted by a hand lever 111 on rock shaft 112, which has an arm 113 on its rear end, see Fig. 6, connected by a rod 114, which is slotted at its upper end, a pin 115 on the bracket 67 engaging in said slot, see Fig. 6. As the hopper box reaches either of its extreme positions, pin 115 engages one or the other end of said slot, thereby rocking, through the connections 113, 114, the shaft 112 and moving the clutch sleeve 104 into neutral position.

The trough-tilting screws 75 are driven by bevel gears 116 thereon in mesh with bevel gears 117, 118, on shaft 87, said screws being carried by the yokes 96, hereinbefore mentioned, swung on said shaft 87.

It will be seen that, during the operation of the mixing blades, the weight 18 rests on the material in the tub and forces it down into said blades, while acting at the same time as a dust-proof cover to prevent any pulverized material such as carbon-black, from escaping. Additional carbon-black, or other ingredients, is admitted, when necessary, through valve 17. When the masticating and mixing operations are completed, the screw 74 is driven, through the gearing described, to pull down the nut 73, and cause the lever 69 to raise the weight 18 which, after it clears the top of the tub neck 11, engages under the surface 69 at the top of the hopper-box, causing the latter to be also raised and tilted rearwardly about its pivot 68 until it reaches the dotted line position of Fig. 6, at which time, if the operator does not pull out the clutch 104 by means of hand lever 111, it is thrown out automatically by the rod 114 being depressed by the pin 115 and rocking the shaft 87 by the arm 112. Now the trough can be tilted forwardly to discharge its contents by throwing in the clutch 88, 89, whereby the shaft 87 is driven and the screws 75 rotated. In case the operator does not release the clutch in time, it is automatically thrown out by the means above described.

In the machine shown in Figs. 8 and 9, the hopper box 13 is mounted to slide on fore-and-aft ways 120 and is so slid by means of racks 121, pinions 122, bevel gears 123 and 124, shaft 125 and hand wheel 126. A tight joint, between the bottom of the hopper-box and the top of the neck 11, is furnished by shoulders 127.

The weight 18 is raised by a motor 33, as in the form of machine first described, the motor and connecting gearing to screw 42 being supported on arm bracket 27 on hopper box 13. In this form of the machine, I have illustrated a separate motor 128 for tilting the trough 10, through gears 129, worm 130, worm-wheel 131, pinions 132 and segment racks 56. The bottom of the weight is preferably inclined toward the center and serrated as above in Figs. 1–8.

Having thus described my invention, what I claim is:

1. In a machine of the class described, the combination of a tiltable mixing trough having an upstanding neck, a hopper-box fitting onto said neck, a weight slidable in said box and neck, means to raise said weight in said box so as to clear said neck, and means to move said box and weight rearwardly off said neck to enable the trough to be tilted.

2. In a machine of the class described, the combination of a mixing trough having an upstanding neck, a hopper-box supported on the frame of the machine and adapted to fit on the top of said neck, a box-like weight slidably fitted in said neck and box, power-driven means to raise and lower said weight, and gear connections to move said box rearwardly off said neck when said weight is raised clear of the latter.

3. In a machine of the class described, the combination of a mixing trough, means to tilt the same to discharge its contents, agitator blades within said trough and means to drive the same, means to close said trough and hold its contents in the path of said blades comprising a hopper-box fitting onto the top of said trough, a box-like weight slidable in said box and neck, and power-driven means to raise and lower said weight, and means under the control of the operator to move said box and weight bodily off said trough toward the rear of the machine to permit the tilting of the trough.

4. In a machine of the class described, the combination of a tiltable mixing trough having an upstanding neck, a box-like weight slidable in said neck to close the same and force the material down in the trough, means to raise and lower said weight, and means to bodily move said weight rearwardly off said trough neck when the trough is to be tilted to discharge its contents.

5. In a machine of the class described, the combination of a mixing trough having oppositely rotating agitator blades therein, means to tilt said trough about the axis of one of said blades to discharge its contents, means to close the open neck of said trough during the mixing operation and force the material down into the path of said blades, and means to elevate and rearwardly remove said closing means from said neck when it is desired to tilt said trough.

6. In a machine of the class described, the combination of an open neck mixing trough, a slidable closure for the same, power means controlling the vertical movements of said closure, means to move said closure rearwardly off said trough neck, and means to tilt said trough forwardly to discharge its contents.

7. In a machine of the class described, the combination of a mixing trough having an upstanding open neck, a hopper-box fitting on said neck, a weight closure sliding in said box and neck, power means mounted on said box to raise and lower said weight, means to move said box and weight rearwardly off said neck, and means in said box and weight whereby ingredients may be introduced into said trough during the mixing operation.

8. In a machine of the class described, the combination of a mixing trough having an upstanding open neck, a hopper-box fitting onto said neck, a weight closure slidable in said box and neck, means carried by said box for elevating said weight clear of said neck, means to swing said box and weight off said neck and means to tilt said trough.

9. In a machine of the class described, the combination of a mixing trough having an upstanding neck, a hopper-box fitting onto said neck, a weight closure slidable in said box and neck, and power means to raise said closure in said box clear of said neck and to swing said box rearwardly off said neck.

10. In a machine of the class described, the combination of a mixing trough having an upstanding neck, a hopper-box fitting onto said neck, a weight slidably fitting said box and neck, means whereby said weight engages said box after it has been raised clear of said neck, and power means to raise said weight and swing it and said box clear of said neck, so as to leave the trough free to be tilted to discharge its contents.

11. In a machine of the class described, the combination with a tiltable mixing trough, of a closure for the same comprising a box fitting thereon, a weight sliding in said box, means to raise and lower said weight, means carried by said weight to enable ingredients to be fed into said trough during the mixing operation, and means to swing said box, with the weight therein, rearwardly off said trough when the operation is completed and it is desired to tilt the trough to discharge its contents.

12. In a machine of the class described, the combination with a trough having an upstanding neck, a box fitting thereon, a weight slidably fitting said box and neck, a hopper on the front of said box and a valve in said weight to enable powdered ingredients to be fed into said trough, means to raise said weight in said box clear of said neck, and means to then swing said box rearwardly off said neck, whereby the latter is freed to discharge the contents of the trough.

13. In a machine of the class described, the combination with a trough having an upstanding neck, of a box fitting thereon and provided with a hopper leading through its front wall, a weight sliding in said box and neck, a rotatable valve in said weight controlling the discharge from said hopper, a screw to raise and lower said weight, power means on said box to drive said screw, a yielding connection between said screw and weight, a rearwardly projecting arm on said box by which it is pivoted on the frame of the machine, and means to swing said box rearwardly about its pivot when said weight is raised clear of said neck and it is desired to discharge the contents of the trough.

14. In a machine of the class described, the combination with a tiltable mixing trough having a flanged upstanding neck, of a hopper-box fitting on said neck, a weight closure for said trough slidable in said box and neck, means to raise and lower said weight, and means to first raise said box off said neck and then swing it and said weight rearwardly off said neck, so as to leave the trough free to be tilted.

15. In a machine of the class described.

the combination with a mixing trough having a flanged neck with an upstanding packing rib on said flange, a flanged box fitting onto said neck and having a groove to receive said rib, a weight slidable in said neck and box, means to raise said weight clear of said neck, and means to raise said box so that said groove will clear said rib and then to swing it and said weight rearwardly off said neck, whereby the latter is free to load or discharge the trough.

16. In a machine of the class described, the combination with a tiltable mixing trough having an upwardly extending flanged open neck, a box frame adapted to be seated on said neck, a weight slidable in said frame and neck, a hopper on the front of said frame, a valve in said weight controlling the passage from said hopper into said neck, means to pivotally support said frame on the machine so that it can be swung rearwardly off of said neck, means to raise said weight in said frame so as to clear said neck, and means to tilt said trough forwardly.

17. In a machine of the class described, the combination with an open neck mixing trough, two parallel shafts therein carrying blades, means to tilt the trough forwardly about the axis of one of said shafts, a weight slidable in said neck to close the same, a valve on said weight to admit ingredients to said trough during the mixing operation, and means to raise said weight out of said neck and to swing it rearwardly to permit the trough to be tilted.

18. In a machine of the class described, the combination of a mixing trough having an open neck, means to tilt said trough forwardly to discharge its contents, a vertical shaft journaled back of said trough, a hopper-box fitting on said neck and having arms secured to said shaft, a weight slidable in said box and neck, means to raise and lower said weight, and means to rotate said shaft.

19. In a machine of the class described, the combination of a mixing trough having an open neck, means to tilt said trough forwardly to discharge its contents, a vertical shaft journaled back of said trough, a hopper-box fitting on said neck and having arms secured to said shaft, a weight slidable in said box and neck, means to raise and lower said weight, means to rotate said shaft, and means to slightly raise said shaft before it commences to rotate.

20. In a machine of the class described, the combination of a mixing trough pivoted to swing forwardly to discharge its contents, and a hopper-box fitting on said trough in its normal position and pivoted to swing rearwardly off the trough.

21. In a machine of the class described, the combination of a mixing trough pivoted to swing upwardly and forwardly to discharge its contents, a hopper-box normally fitting on said trough and pivoted to swing rearwardly off said trough, a weight slidable in said hopper-box and the top of said trough, and means to raise and lower said weight.

22. In a machine of the class described, the combination of a mixing trough having an open neck, means to tilt said trough forwardly to discharge its contents, a hopper-box fitting onto said neck, a weight slidable on said box and neck, means on said box to raise and lower said weight, and means to swing said box and weight rearwardly off said neck.

23. In a machine of the class described, the combination of a trough having an open neck, a hopper-box fitting thereon, a weight slidable in said box and neck, power means to raise and lower said weight, and a yielding connection between said means and weight.

24. In a machine of the class described, the combination of a trough having an open neck, a weight slidable in said neck, power connections including a yielding element to raise and lower said weight and means to introduce material into said neck through said weight.

25. In a machine of the class described, the combination of a trough having an open rectangular neck, a weight slidable in said neck and having an angular serrated bottom, and means to yieldingly suspend said weight.

26. In a machine of the class described, the combination of a trough having an open neck, a box fitting on said neck, a weight slidable in said box and neck, means on said box to raise and lower said weight, said box being mounted to swing horizontally off said neck, and means to raise said box slightly and then swing it off said neck.

27 In a machine of the class described, the combination of a trough pivoted to tilt about an internal axis, a box fitting onto said trough and pivoted to swing about an external axis, a weight slidable in said box, means to raise and lower said weight, means to tilt said trough, and means to swing said box and weight about said external axis.

28. In a machine of the class described, the combination with the mixing trough, of a hopper-box fitting thereon, a weight closure sliding in said box, a valve in the lower part of said weight closure, a hopper on said box leading to said valve, and a pipe secured to the outside of said hopper and also leading to said valve.

29. In a machine of the class described, the combination with the mixing trough, of a box fitting thereon, a weight closure sliding in said box, a hopper on the front of said box, a valve in said weight closure, a pipe on the front of said hopper, a funnel on the end of said pipe, and a valve in said pipe, whereby powdered and liquid materials can be introduced into the trough without removing the closure.

30. In a machine of the class described, the combination with the mixing trough having an upwardly extending open neck, a hopper-box fitting onto said neck, a closure slidably mounted in said box and neck, a rotary valve in said closure, a hopper for powdered ingredients and a pipe for liquid ingredients carried on the outside of said box and leading to said rotary valve.

In testimony whereof I have hereunto set my hand.

CLIFFORD C. MOSHER.